United States Patent [19]

Steenblock et al.

[11] Patent Number: 5,703,161

[45] Date of Patent: Dec. 30, 1997

[54] POLYMER MIXTURE AND FILMS PREPARED THEREFROM

[75] Inventors: Roland Eugen Steenblock, Meckenheim; Norbert Franz Kock, Wachtberg; Detlef Herbert Fiedler, Bonn, all of Germany

[73] Assignee: Elf Atochem Deutschland GmbH, Dusseldorf, Germany

[21] Appl. No.: 703,504

[22] Filed: Aug. 27, 1996

Related U.S. Application Data

[62] Division of Ser. No. 410,107, Mar. 24, 1995, Pat. No. 5,614,588.

[30] Foreign Application Priority Data

Mar. 24, 1994 [DE] Germany .................... 44 10 921.0

[51] Int. Cl.⁶ .................................. C08G 63/48
[52] U.S. Cl. .................... 525/66; 428/474.4; 428/475.5; 428/290
[58] Field of Search .................... 525/66, 69, 71, 525/89, 92 B, 183; 428/474.4, 475.5, 224, 289, 290

[56] References Cited

U.S. PATENT DOCUMENTS

| | | | |
|---|---|---|---|
| 4,230,838 | 10/1980 | Foy et al. | 525/408 |
| 4,252,920 | 2/1981 | Deleens et al. | 525/430 |
| 4,370,374 | 1/1983 | Raabe et al. | 428/216 |
| 4,707,528 | 11/1987 | Koizumi et al. | 525/432 |
| 5,024,792 | 6/1991 | Havens | 264/22 |
| 5,140,065 | 8/1992 | Dalla et al. | 525/66 |
| 5,348,804 | 9/1994 | Vasselin et al. | 428/423.1 |
| 5,356,709 | 10/1994 | Woo et al. | 428/376 |
| 5,369,179 | 11/1994 | Havens | 525/183 |

FOREIGN PATENT DOCUMENTS

| | | |
|---|---|---|
| 2003489 | 5/1990 | Canada . |
| 0476963A2 | 3/1992 | European Pat. Off. . |
| 0482833A2 | 4/1992 | European Pat. Off. . |
| 0560630A1 | 9/1993 | European Pat. Off. . |

*Primary Examiner*—Mark L. Warzel
*Attorney, Agent, or Firm*—Merchant, Gould, Smith, Edell, Welter & Schmidt

[57] ABSTRACT

The invention relates to a polymer mixture which contains (A) 50 to 85 wt. % of a polyether block amide consisting of 30 to 60 wt. % of polyamide-12, polyamide-11 and/or polyamide-12,12 blocks and 70 to 40 wt. % of polyethylene glycol blocks, (B) 10 to 40 wt. % of a polyether block amide consisting of 65 to 85 wt. % of polyamide-12, polyamide-11 and/or polyamide-12,12 blocks and 35 to 15 wt. % of polyethylene glycol blocks, and (C) 5 to 40 wt. % of a poly(ethylene-co-vinylacetate-g-maleic anhydride) polymer consisting of 75 to 95 wt. % of ethylene, 5 to 25 wt. % of vinylacetate and 0.1 to 2 wt. % of maleic anhydride, wherein the data relating to wt. % for the constituents (A), (B) and (C) are with reference to the total amount of polymer mixture. The invention also relates to films produced from this polymer mixture and the use of these films to produce waterproof, water vapor permeable, wind resistant textile composite materials, dressing materials and hygiene items.

3 Claims, No Drawings

POLYMER MIXTURE AND FILMS PREPARED THEREFROM

This is a Divisional of application Ser. No. 08/410,107, filed Mar. 24, 1995, now U.S. Pat. No. 5,614,588 which application(s) are incorporated herein by reference.

The invention relates to a polymer mixture of polyether block amides and a poly(ethylene-co-vinylacetate-g-maleic anhydride) polymer and films prepared therefrom. The invention also relates to the use of these films for producing waterproof, water vapour permeable, wind resistant textile composites, dressing materials and hygiene items.

Water vapour permeable, waterproof films are used in a very wide range of areas. Basically, porous and compact films have to be differentiated. Porous films made from stretched microporous polytetrafluoroethylene are sold under the name Goretex®. Compact films made from polyetherester block copolymers are sold under the name Sympatex®. Films made from polyether block amides, which are very permeable to water vapour are described, for example, in EP-A-0 378 015. EP-A-0 476 963 discloses non-porous, water vapour permeable films based on a polymer mixture of a hydrophilic poly(ether-co-amide), containing 20 to 80 wt. % of polyethylene glycol blocks, and a hydrophobic polymer selected from the following group: a) a block poly (ether-co-amide) with no polyethylene glycol blocks; b) a polyamide; c) a polyester or polyurethane. This film, however, in many cases does not have sufficient strength, to which reference is also made in EP-A-0 560 630. EP-A-0 560 630 shows how to achieve higher tensile strengths, in particular when using the films in the medical field, by co-lamination with the formation of a two-layered polymer film, which, however, involves increased technical complexity. Thermoplastic elastomer compositions based on polyamides and modified polyolefins and the production of moulded parts, extruded items and films therefrom are described in EP-A-0 459 862. The films produced in this way, however, are used in particular to bond or to coat other materials. Polyetherester amides based on polytetramethylene glycol (PTMG) are preferably used in this reference and are exclusively used in the examples. Polyetherester amides of this type, however, are not suitable for the requirements described below, due to their low hydrophilicity.

Basically, a water vapour permeable, waterproof film should satisfy a number of different requirements. Thus, the film should have a homogeneous appearance and in particular should not have any specks. It should feel like a fabric and have a certain degree of softness. It should be wind resistant and be highly permeable to water vapour. On the one hand it should be highly elastic, but on the other hand it should be stable and firm when highly stretched. For application in the medical field, imperviousness to bacteria and microbes is important. Furthermore, the film should be resistant to washing. The polymer mixture provided for producing the film should be readily processable to give the desired film. Furthermore the film must be capable of being bonded to other materials such as textiles to give composite materials without causing any problems. Although the known films, mentioned above, are very permeable to water vapour, they do on the other hand have certain disadvantages such as, for instance, poor processability, both during production of the films and when processing the composite materials made from the films. The films themselves and the composite materials prepared therefrom exhibit a troublesome rustling or crackling noise. The films take up considerable quantities of water and have a poor resistance to washing procedures. Thus, films prepared from known polyether block amides with a capacity for water absorption of more than 30%, only partially satisfy the requirements placed on waterproof, water vapour permeable films. Depending on the polyether block amide used, high water vapour permeability, acceptable softness, natural feel of the fabric and only slight rustling are associated with an impairment in processability as well as blockages during production of the films, migration of monomers or oligomers, high water absorption and poor resistance to washing procedures of the composite textiles produced from the films. If polyether block amides with a water absorption of 10 to 15% are used to prepare films, then although these exhibit a combination of good processability, high water absorption and good wash-resistance, they are permeable to water vapour to only a limited extent, the feel and the softness of the fabric are unsatisfactory and the films rustle and crackle a great deal. Films prepared from mixtures of polyether block amides with different water absorptions (polymer blends) on the other hand have improved properties, but they are still difficult to process.

Accordingly, the object of the invention is to provide a polymer mixture and a film prepared therefrom which satisfies the requirements mentioned above and which largely overcomes the disadvantages of known films.

Surprisingly, this object is achieved according to the invention by a polymer mixture which is characterised in that it contains (A) 50 to 85 wt. % of a polyether block amide consisting of 30 to 60 wt. % of polyamide-12, polyamide-11 and/or polyamide-12,12 blocks and 70 to 40 wt. % of polyethylene glycol blocks, (B) 10 to 40 wt. % of a polyether block amide consisting of 65 to 85 wt. % of polyamide-12, polyamide-11 and/or polyamide-12,12 blocks and 35 to 15 wt. % of polyethylene glycol blocks, and (C) 5 to 40 wt. % of a poly(ethylene-co-vinylacetate-g-maleic anhydride) polymer consisting of 75 to 95 wt. % of ethylene, 5 to 25 wt. % of vinylacetate and 0.1 to 2 wt. % of maleic anhydride, wherein the data relating to wt. % for the constituents (A), (B) and (C) are with reference to the total amount of polymer mixture.

The polymer mixture preferably contains 65 to 75 wt. % of polyether block amide (A), 15 to 25 wt. % of polyether block amide (B) and 5 to 15 wt. % of poly(ethylene-co-vinylacetate-g-maleic anhydride) polymer (C), wherein the data relating to wt. % for the constituents (A), (B) and (C) are with reference to the total amount of polymer mixture.

The polyether block amides used in the polymer mixture according to the invention are polycondensation products known per se, which can be produced by polycondensation from polyamide-12, polyamide-11 and/or polyamide-12,12 sequences with reactive terminal groups and polyethylene glycol sequences with reactive terminal groups. Dicarboxyl-terminated polyamide-12, polyamide-11 and/or polyamide-12,12 sequences are expediently reacted with polyethylene glycol diols. The production of such polyether block amides is described, for instance, in EP-A-0 378 015 which was mentioned in the introduction or in French patents FR 2 273 021 and FR 2 401 947. The polyether block amides (A) and (B) which can be used are differentiated by the ratio by weight of polyamide blocks to polyethylene glycol blocks. The change in this ratio by weight is effected by adjusting the number average molecular weight of the polyamide blocks and/or the polyethylene glycol blocks. If the polyethylene glycol blocks in the polyether block amides (A) and (B) have approximately the same value, as is possible according to one embodiment, the molecular weight of the polyamide blocks must be adjusted in order to produce the desired ratio by weight. Polyether block amide (A) preferably consists of 45 to 55 wt. % of polyamide-12, polyamide-11 and/or polyamide-12,12 blocks and 55 to 45 wt. % of polyethylene glycol blocks. Polyether block amide (B) preferably consists of 70 to 80 wt. % of polyamide-12 blocks and 30 to 20 wt. % of polyethylene glycol blocks. The number average molecular weight of polyamide-12, polyamide-11 and/or polyamide-12,12 is expediently 500 to 10000, preferably 600 to 5000. The number average molecular weight of the polyethylene glycol blocks is expediently between 200 and 6000, preferably 600 to 3000 and in particular about 1500. Polyether block amides which are based on polyamide-12 and polyethylene glycol are preferably used as polyether block amides (A) and (B).

The different ratios by weight of polyamide-12, polyamide-11 and/or polyamide-12,12 blocks (so-called hard segments) to polyethylene glycol blocks (so called soft segments) produce their different Shore hardnesses in the polyether block amides (A) and (B). Polyether block amides (A) preferably have a Shore hardness of 35 D to 45 D. Polyether block amides (B) preferably have a Shore hardness of 50 D to 65 D.

The poly(ethylene-co-vinylacetate-g-maleic anhydride) polymer is a statistical or block copolymer known per se consisting of ethylene and vinylacetate as a graft substrate, onto which maleic anhydride has been grafted. It consists of 75 to 95 wt. % of ethylene, 5 to 25 wt. % of vinylacetate and 0.1 to 2 wt. % of maleic anhydride and preferably of 80 to 90 wt. % of ethylene, 10 to 20 wt. % of vinylacetate and 0.2 to 0.5 wt. % of maleic anhydride.

The polymer mixture according to the invention can be processed, optionally with the addition of further film-producing and extrusion-aiding additives such as colorants, lubricants, pigments, etc. which are known from the prior art, to form water vapour permeable, waterproof films.

The polymer mixture according to the invention is expediently prepared by mixing weighed-out amounts of the three components in a mixer and then preparing them in the form of a free-flowing mixture (dry blend). Production of the films according to the invention is preferably performed by extrusion. Extrusion may be performed in either a blown film or in a flat film extrusion process. The film is expediently coextruded together with a backing film by means of a coextrusion blown film process, as is described, for instance, in EP 0 024 740.

The films produced in this way expediently have a thickness of less than 150 µm, preferably between 5 and 80 µm and in particular between 5 and 30 µm.

The films produced according to the invention expediently have, at a thickness of 15 µm, a water vapour permeability according to DIN 53122 of at least 4000, preferably at least 4500 and in particular of 5000 g/m²/24 h. Achieving such a high water vapour permeability proved to be extraordinarily surprising because on mixing relatively hydrophilic polyether block amide (A) with relatively hydrophobic polyether block amide (B) and hydrophobic terpolymer (C) a severe, proportional reduction in water vapour permeability would have been expected. It was shown, however, that the water vapour permeability remained at or even surpassed the same high value as that for polyether block amide (A), with a simultaneous improvement in the mechanical properties and processability of the films. This represents an unexpected synergistic effect which results from mixing the constituents (A), (B) and (C).

Thus, the disadvantages mentioned in the introduction are surprisingly overcome and the requirements for a water vapour permeable, waterproof film are largely satisfied by the films prepared from the polymer mixture provided in accordance with the invention made from polyether block amides (A) and (B) and poly(ethylene-co-vinylacetate-g-maleic anhydride) polymer.

Due to the properties of the films according to the invention, described above, these are suitable in particular for producing textile composite materials, dressing materials and hygiene articles such as nappies, breathable dressing materials such as plasters, medical clothing including gloves and face masks (mouth masks). Examples of composite materials are those for waterproof, wind resistant and breathable items of clothing, such as occupational clothing, protective working clothing, leisure clothing such as mountaineering clothing, clothing for maritime purposes, for shoes and leisure items such as tents, rucksacks and bicycle panniers.

The invention described above is explained by means of the following examples.

EXAMPLE 1

70 parts by wt. of Pebax® MX 1074 (Pebax is an Elf Atochem tradename), a polyether block amide of the general formula

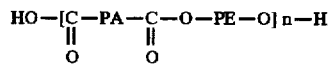

based on PA-12 as a hard segment and PEG as a soft segment with a Shore hardness D of about 39 (measured in accordance with ASTM D 2240) and a melt flow index of about 10 g/10 min at 235° C./kg (ASTM D 1238) as polyether block amide (A), 20 parts by wt. of Pebax® MX 1041 (Pebax is an Elf Atochem tradename), a polyether block amide of the general formula

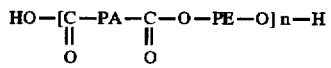

based on PA-12 as a hard segment and PEG as a soft segment with a Shore hardness D of about 56 (ASTM D 2240) and a melt flow index of about 10 g/10 min at 235° C./kg (ASTM D 1238) as polyether block amide (B) and 10 parts by wt. of Orevac® 9307 (Orevac is an Elf Atochem tradename), a poly(ethylene-co-vinylacetate-g-maleic anhydride)polymer consisting of about 14 wt. % of vinylacetate and about 85.7 wt. % of ethylene as copolymer, onto which about 0.3 wt. % of maleic anhydride has been grafted, with a melt flow index of about 6 g/10 min and a Shore hardness D of about 33 (ASTM D 2240) as component (C), were mixed in granular form and extruded as follows:

Two extruders, the internal one with a throughput of ca. 17 kg/h and the external one with a throughput of ca. 6.5 kg/h, are connected to an extrusion head with two concentric circular slits of 150 mm. Through the internal extruder was supplied, as backing material, LDPE (low density polyethylene) and through the external extruder a dry blend of the polymer mixture.

The temperature in the extrusion head was 174° C.; the width of the double slotted film was 450 mm. The wall thicknesses of the film produced were

| | |
|---|---|
| backing film | 40 μm |
| film acc. to the invention | 15 μm |

The film according to the invention could easily be peeled away from the backing film.

The 15 μm film produced according to the invention had a water vapour permeability of 5209 g/m²/24 h (conditions: 38° C./90%, DIN 53122). It exhibited exceptional adhesion to commercially available laminating adhesives and reaction foams which was well above that of known films such as those based on polybutylene terephthalate as hard segment and polyethylene glycol as soft segment. The film produced according to the invention is clear, transparent, free of streaks, had no specks or smears and did not rustle or block.

COMPARISON EXAMPLE 1

Two extruders, the internal one with a throughput of ca. 17 kg/h and the external one with a throughput of ca. 6.5 kg/h, are connected to an extrusion head with two concentric circular slits of 150 mm. Through the internal extruder was supplied, as backing material, LDPE and through the external extruder only polyether block amide (A) (Pebax® MX 1074) from example 1.

The temperature in the extrusion head was 174° C.; the width of the double slotted film was 450 mm. The wall thicknesses of the film produced were

| | |
|---|---|
| backing film | 40 μm |
| comparison film | 15 μm |

The comparison film exhibited a strong rolling-up effect after removing the backing film. After winding up the comparison film and storing for a few days, it could no longer be unrolled because the layers had stuck together. The comparison film produced in this way had a water vapour permeability of 4914 g/m²/24 h (conditions: 38° C./90%, DIN 53122). The film felt hard. It had a very strong blocking behaviour, and tended to roll up towards the side from which the backing had been removed. After a short time it exhibited a bloom.

COMPARISON EXAMPLE 2

| | |
|---|---|
| 80 parts by wt. | of polyether block amide (A) (Pebax ® MX 1074) from example 1 |
| 20 parts by wt. | of poly(ethylene-co-vinylacetate-g-maleic anhydride) polymer (C) (Orevac ® 9307) from example 1 | were extruded as follows:

Two extruders, the internal one with a throughput of ca. 17 kg/h and the external one with a throughput of ca. 6.5 kg/h, are connected to an extrusion head with two concentric circular slits of 150 mm. Through the internal extruder was supplied, as backing material, LDPE and through the external extruder a dry blend of the polymer mixture mentioned above. The temperature in the extrusion head was 174° C.; the width of the double slotted film was 450 mm. The wall thicknesses of the film produced were

| | |
|---|---|
| backing film | 40 μm |
| comparison film | 15 μm |

The coating film could easily be peeled away from its backing film.

The film produced in this way had a water vapour permeability of 5193 g/m²/24 h (conditions: 38° C./90%, DIN 53122); although it had a reduced blocking effect, it lost its transparency and was inhomogeneous and streaky.

We claim:

1. A process for producing a waterproof, water vapor permeable, wind resistant textile composite material comprising combining a film and a textile material; wherein, the film is water vapor permeable and waterproof, and is produced from a polymer mixture comprising:

constituent (A) 50 to 85 wt. % of a polyether block amide consisting of 30 to 60 wt. % of polyamide-12, polyamide-11 and/or polyamide-12,12 blocks and 70 to 40 wt. % of polyethylene glycol blocks, constituent (B) 10 to 40 wt. % of a polyether block amide consisting of 65 to 85 wt. % of polyamide-12, polyamide-11 and/or polyamide-12,12 blocks and 35 to 15 wt. % of polyethylene glycol blocks, and constituent (C) 5 to 40 wt. % of a poly(ethylene-co-vinylacetate-g-maleic anhydride) polymer consisting of 75 to 95 wt. % of ethylene monomer, 5 to 25 wt. % of vinylacetate monomer and 0.1 to 2 wt. % of maleic anhydride monomer, wherein the wt. % for the constituents (A), (B) and (C) are based upon the total amount of polymer mixture and the wt. % for the blocks making constituents (A) and (B), and the monomers making constituent C are based upon the weight of the constituent.

2. A composite material produced according to the process of claim 1.

3. A composite material according to claim 2 wherein the film covers at least part of the outer surface of the textile material.

* * * * *